Oct. 7, 1947.  W. P. OEHLER  2,428,679
FLEXIBLE CHUTE FOR PLANTERS
Filed Feb. 23, 1945
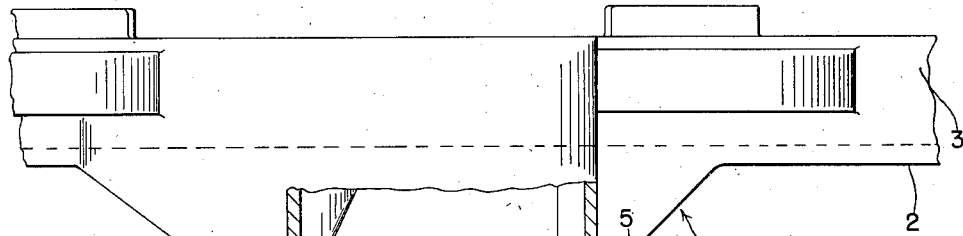
FIG. 1
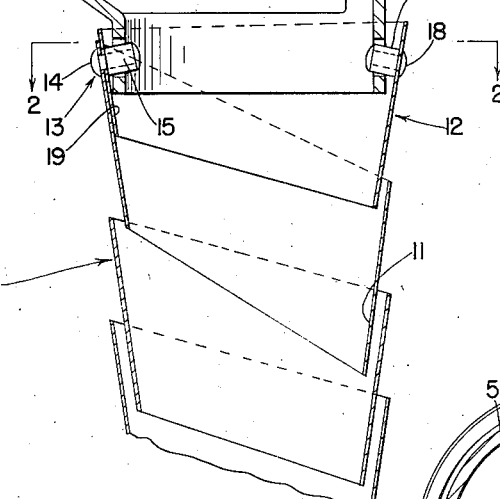
FIG. 2
FIG. 3
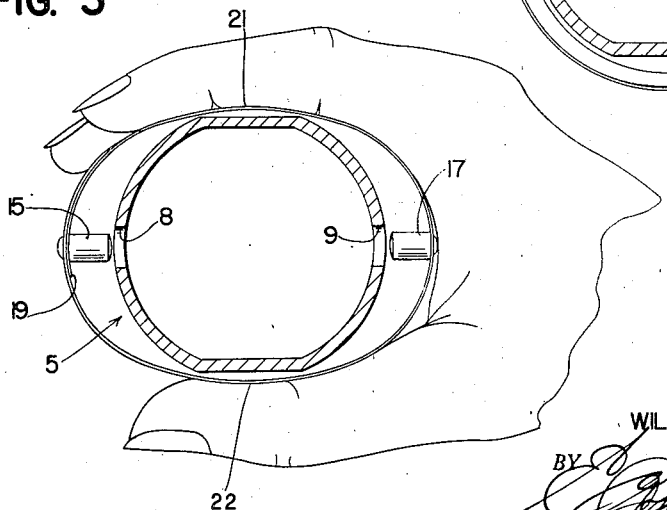
WITNESS
E. B. Bjurstrom
INVENTOR.
WILLIAM P. OEHLER
BY
ATTORNEYS Patented Oct. 7, 1947

2,428,679

UNITED STATES PATENT OFFICE 2,428,679

FLEXIBLE CHUTE FOR PLANTERS

William P. Oehler, Moline, Ill., assignor to Deere & Company, Moline, Ill., a corporation of Illinois Application February 23, 1945, Serial No. 579,356

10 Claims. (Cl. 193—9)

The present invention relates generally to agricultural machines and more particularly to fertilizer hoppers, such as those employed either independently of or as attachments for planters and the like for distributing fertilizer.

The object and general nature of the present invention is the provision of a new and improved attaching means which is considerably simpler and cheaper than attaching means now in common use, said attaching means being particularly adapted to releasably secure the upper end of a fertilizer or seed tube or conduit to the funnel section of the hopper bottom, the funnel section being that portion of the hopper bottom through which fertilizer, seed, or other material is commonly discharged by suitable material dispensing mechanism.

More specifically, it is a feature of this invention to provide a novel hopper bottom, particularly the funnel section thereof, which is provided merely with a pair of generally oppositely arranged holes, rather than grooves and sockets heretofore employed as a part of conventional bayonet type joint connections between the fertilizer or seed tube or spout and the hopper bottom. Further, it is a feature of this invention to provide the material conducting tube or spout with an upper resilient section provided with inwardly extending lugs which are separated when the sides of the resilient section are pressed toward one another, and in this connection it is a particular feature of the present invention to form the funnel section of the hopper bottom of such size and shape that, with the sides thus pressed toward one another to separate the studs, the tube may be readily placed in embracing relation over the lower end of the funnel section and arranged so that when released the studs move into the holes in the walls of the funnel section whereby the material conducting tube is connected in material-receiving relation with the hopper bottom with no danger of accidental detachment and, further, without relying upon any twist or torsion in the tube holding the connections tight.

These and other objects and advantages of the present invention will be apparent to those skilled in the art after a consideration of the following detailed description, taken in conjunction with the accompanying drawings in which:

Figure 1 is a fragmentary view of a fertilizer hopper bottom and a fertilizer tube or spout connected thereto by means in which the principles of the present invention have been incorporated.

Figure 2 is a sectional view taken generally along the line 2—2 of Figure 1.

Figure 3 is a view similar to Figure 2 but showing the manner of pressing the upper end of the tube to separate the studs sufficient to engage them with the funnel section of the hopper bottom.

The hopper bottom is indicated in its entirety by the reference numeral 1 and includes a plate like member 2 having flanges 3 and, at one side, formed with a depending funnel section 5 into which the fertilizer distributing mechanism (not shown) causes the fertilizer in the hopper to be directed. The funnel section 5, as best shown in Figure 2, is generally circular except for having flattened sides 6 and 7. Diametrically opposite stud-receiving openings 8 and 9 are formed in the side walls of the hopper funnel section 5.

A fertilizer tube or spout is indicated in its entirety by the reference numeral 10 and includes a ribbon 11 of resilient material wound spirally in a more or less conventional manner, terminating upwardly in a flared section 12 that is formed by appropriate shaping of the upper end of the ribbon and the attachment of the ribbon end to an adjacent coil, as indicated at 13. This attachment is preferably made by means of a rivet 14 on which a wear resisting bushing 15, on the inside of the tube, is disposed. The bushing 15 and its rivet 14 form one of the attaching studs, and the other attaching stud is made up of a wear resisting bushing 17 and its attaching rivet 18. The end of the ribbon, thus attached to its adjacent coil, is indicated by the reference numeral 19.

The upper end of the fertilizer tube 10 is slightly larger than the external diameter of the hopper bottom funnel section 5. The parts are so dimensioned that when the sides of the upper portion of the fertilizer tube 10 are pressed toward one another, as shown in Figure 3, the sides of the tube thus pressed together being indicated in Figure 3 by the reference numerals 21 and 22, the studs 15 and 17 are separated a distance sufficient to cause them to clear the lower end of the funnel section 5 and to permit the fertilizer tube to be applied over the lower end of the funnel section in embracing relation so that, upon being released, the resilience of the upper end of the tube causes the studs 15 and 17 to spring into place in the openings 8 and 9 in the hopper bottom funnel section 5, as shown in Figures 1 and 2. The tube may be readily detached from the hopper bottom merely by pressing the sides 21 and 22 toward one another and removing the tube when the studs 15 and 17 clear the holes 8 and 9.

In the form of the invention described specifically above, the flexible tube fastening has been described in connection with the hopper bottom of a fertilizer attachment, but it will be understood that the principles of the present invention are equally applicable to the dispensing mechanism of the planter or, as a matter of fact, any other mechanism or device where it is desired to attach a tube or conduit to another part in a quick and easy manner.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a fertilizer distributor, a hopper bottom having a downwardly depending funnel section forming a discharge for the hopper bottom and the funnel section of said hopper bottom having a pair of generally oppositely arranged openings in the walls thereof, and a fertilizer tube having an upper resilient section somewhat larger than the lower portion of said funnel section, said flexible section carrying a pair of generally oppositely disposed and laterally inwardly extending studs, the latter being of such length and the resilient section being sufficiently larger than said funnel section to provide for pressing the opposite sides of the resilient section to separate said studs a distance sufficient to permit the application of said resilient section in embracing relation with respect to said funnel section, release of said resilient section causing said studs to enter the openings in said funnel section and thereby connect the fertilizer tube thereto.

2. The invention set forth in claim 1, further characterized by the sides of the funnel section of said hopper bottom being flattened to facilitate the application of said resilient section thereto when the sides of the latter are pressed together to separate said studs.

3. The invention set forth in claim 1, further characterized by each of said studs comprising a wear resisting bushing and a rivet fixing the bushing to the side walls of said resilient section.

4. The invention set forth in claim 1, further characterized by said resilient section being formed as a spirally wound resilient strip, and means whereby one of said studs serves to hold the end of said strip against unwinding.

5. A tube for fertilizer and similar material, comprising a conduit having an attaching section formed of resilient material and peripherally and structurally continuous, forming a section of endless or ring-like configuration whereby opposite portions of the same may be separated an additional distance by pressing the sides, and attaching projections located axially inwardly of the end of said attaching section and extending laterally inwardly from said displaceable opposite portions.

6. A fertilizer tube comprising a conduit having its upper end formed of resilient material whereby opposite portions of the same may be separated an additional distance by pressing the sides, and attaching studs extending laterally inwardly from said upwardly displaceable opposite portions, said fertilizer tube being formed of a spirally wound ribbon of resilient material and provided with a pair of diametrically disposed generally laterally inwardly extending lugs, one of said lugs including securing means extending through one end of said ribbon and the adjacent coil so as to form the upper end of said fertilizer tube and hold the upper end of the tube in shape.

7. In an agricultural machine, a funnel section through which material normally is discharged, said funnel section being approximately oval in cross section and having a pair of diametrically opposed openings disposed in the more widely separated wall portions of the funnel section, and a conduit having a resilient section of a diameter of which approximates the longer dimension of said oval portion, said resilient section having a pair of generally oppositely disposed and laterally inwardly extending studs, the latter being of such a length and the resilient section being of such a dimension that when the sides of said resilient section are pressed together, the resilient section may be applied to the funnel section with the studs overlying said oppositely arranged openings, release of said resilient section causing the studs to enter said openings and thereby connect the conduit to said funnel section.

8. In an agricultural machine, a discharge section through which normally material is discharged, said discharge section approximating an oval in cross section, said discharge section having a pair of diametrically opposed openings formed in opposite side walls thereof, and a conduit having a resilient section, the latter carrying a pair of studs arranged generally diametrically and the resilient section of the conduit being normally approximately circular and of such dimension, relative to the oval discharge section, that by pressing the sides of said resilient conduit section the studs may be displaced so as to clear said openings in the discharge section and to provide for the application of the conduit to said discharge section, release of said resilient section causing the suds to enter said openings and thereby connect said conduit to said discharge section.

9. In an agricultural machine or the like having a discharge section through which material is normally moved, a conduit adapted to receive said material and to be detachably connected with said section, said conduit comprising a tube having one end formed of resilient material approximately circular and peripherally continuous whereby generally opposite portions of the tube end may be moved generally in opposite directions with respect to each other, and attaching studs carried by generally opposite portions of said tube end and adapted to be displaced in generally opposite directions with respect to each other by pressing the tube from opposite sides, said discharge section normally having means interlocking with said studs in the positions they occupy when the tube is released.

10. In an agricultural machine or the like, a pair of means forming telescopically associated material-receiving conduit sections, one of said conduit sections having an end adapted to be assembled with the associated portion of the other conduit section, the end of said one conduit section being formed of resilient material and peripherally continuous whereby said end may be distorted out of a normal position by pressing the sides thereof and separating portions of said end generally in opposite directions, means formed on said opposite portions and on the adjacent portions of said other conduit section forming studs and stud-receiving openings which interlock when the end of said one conduit section is released, pressing the sides of said one conduit section serving to distort said end and disengage said studs and openings.

WILLIAM P. OEHLER.

REFERENCES CITED

The following references are of record in the file of this patent:

UNITED STATES PATENTS

| Number | Name | Date |
|---|---|---|
| 694,419 | Renaker | Mar. 4, 1902 |
| 718,599 | Bubb | Jan. 20, 1903 |

Certificate of Correction

Patent No. 2,428,679. October 7, 1947.

WILLIAM P. OEHLER

It is hereby certified that error appears in the printed specification of the above numbered patent requiring correction as follows: Column 4, line 46, claim 8, for "suds" read *studs*; and that the said Letters Patent should be read with this correction therein that the same may conform to the record of the case in the Patent Office.

Signed and sealed this 16th day of December, A. D. 1947.

[SEAL]

THOMAS F. MURPHY,
*Assistant Commissioner of Patents.*